United States Patent
Marriott et al.

(10) Patent No.: US 9,809,193 B2
(45) Date of Patent: Nov. 7, 2017

(54) SHOCK ABSORBING HEIGHT ADJUSTERS FOR RESTRAINT SYSTEMS AND ASSOCIATED SYSTEMS AND METHODS

(71) Applicant: Shield Restraint Systems, Inc., Elkhart, IN (US)

(72) Inventors: Brandon Scott Marriott, Goshen, IN (US); Alexander John Szewczyk, Elkhart, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 0 days.

(21) Appl. No.: 15/226,466

(22) Filed: Aug. 2, 2016

(65) Prior Publication Data

US 2017/0267208 A1    Sep. 21, 2017

Related U.S. Application Data

(60) Provisional application No. 62/309,358, filed on Mar. 16, 2016.

(51) Int. Cl.
*B60R 22/20* (2006.01)
*B60R 22/18* (2006.01)

(52) U.S. Cl.
CPC .......... *B60R 22/203* (2013.01); *B60R 22/202* (2013.01); *B60R 2022/1818* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,366,243 A | * | 11/1994 | Ray | B60R 22/203 280/801.2 |
| 5,566,978 A | * | 10/1996 | Fleming | B60R 22/1951 188/377 |
| 5,609,367 A | | 3/1997 | Eusebi et al. | |
| 5,628,529 A | * | 5/1997 | Golz | B60R 22/201 280/801.2 |
| 5,732,974 A | | 3/1998 | Sayles | |
| 5,860,675 A | * | 1/1999 | Muller | B60N 2/4214 280/801.2 |
| 5,931,502 A | * | 8/1999 | Frank | B60R 22/203 280/801.2 |
| 6,123,391 A | * | 9/2000 | Boelstler | B60R 22/203 297/464 |

(Continued)

FOREIGN PATENT DOCUMENTS

DE     19630498     2/1998

*Primary Examiner* — Nicole T Verley
(74) *Attorney, Agent, or Firm* — Perkins Coie LLP

(57) ABSTRACT

Shock absorbing seatbelt height adjusters for use with vehicle occupant restraint systems, and associated systems and methods are disclosed herein. In one embodiment, a shock absorbing height adjuster includes a D-loop assembly slidably coupled to a rail, and a stop assembly and a pre-loader slidably coupled to the rail on opposite sides of the D-loop assembly. The stop assembly and the pre-loader can be releasably lockable at a plurality of positions along the rail. A biasing member can be compressed between the pre-loader and the D-loop assembly to urge the D-loop assembly toward the stop assembly and allow motion of the D-loop assembly toward the pre-loader under load. The position of the pre-loader can be adjusted to vary the compression in the biasing member.

20 Claims, 6 Drawing Sheets

(56) References Cited

U.S. PATENT DOCUMENTS

| | | | |
|---|---|---|---|
| 6,786,510 B2 * | 9/2004 | Roychoudhury | B60R 22/02 |
| | | | 280/802 |
| 6,802,537 B1 * | 10/2004 | Tolfsen | B60N 2/508 |
| | | | 280/727 |
| 7,232,154 B2 | 6/2007 | Desmarais et al. | |
| 8,002,358 B2 * | 8/2011 | Marriott | B60N 2/688 |
| | | | 280/808 |
| 8,800,735 B2 * | 8/2014 | Ruthinowski | B60N 2/2809 |
| | | | 188/372 |
| 8,820,789 B2 * | 9/2014 | Merrill | B60N 2/24 |
| | | | 280/806 |
| 9,004,606 B2 * | 4/2015 | Bostrom | B60N 2/688 |
| | | | 297/464 |
| 9,623,836 B2 * | 4/2017 | Kujawa | B60R 22/195 |
| 2007/0013185 A1 * | 1/2007 | Desmarais | B60R 22/202 |
| | | | 280/801.2 |
| 2008/0136141 A1 * | 6/2008 | Gray | B60R 22/202 |
| | | | 280/727 |

* cited by examiner

SHOCK ABSORBING HEIGHT ADJUSTERS FOR RESTRAINT SYSTEMS AND ASSOCIATED SYSTEMS AND METHODS

CROSS-REFERENCE TO RELATED APPLICATIONS

This application claims priority to U.S. Provisional Application No. 62/309,358, filed Mar. 16, 2016, and entitled "SHOCK ABSORBING HEIGHT ADJUSTERS FOR RESTRAINT SYSTEMS AND ASSOCIATED SYSTEMS AND METHODS", which is incorporated herein by reference in its entirety.

TECHNICAL FIELD

The following disclosure is directed to shock absorbing height adjusters for use in vehicle occupant restraint systems.

BACKGROUND

Restraint systems for use in cars, trucks and other vehicles often include a turning loop or D-loop near an occupant's shoulder. The D-loop redirects a seatbelt web that extends upwardly from a retractor, through the D-loop, and then downwardly at an angle across the occupant's torso. In the event of a collision or other high deceleration event that causes locking of the retractor, the D-loop acts as a rigid anchor for the seatbelt web and resists forward motion of the occupant. Although many situations require significant tension in the web to properly restrain an occupant, this tension can result in substantial discomfort. For example, in recreational utility vehicles (RUVs) or utility task vehicles (UTVs), aggressive driving in off-road conditions can result in repeated application of high tension loads in the web, causing discomfort and/or fatigue for the operator.

DETAILED DESCRIPTION

The following disclosure describes various embodiments of shock absorbing seatbelt height adjusters and associated systems and methods. In some embodiments, a shock absorbing seatbelt height adjuster includes a rail, a stop assembly, a D-loop assembly, and a pre-loader. As described in greater detail below, the D-loop assembly can include a D-loop that provides a turning point for a seatbelt web (e.g., a shoulder belt web). The D-loop assembly, the stop assembly, and the pre-loader can be slidably coupled to the rail, and the stop assembly and the pre-loader can be releasably lockable at a plurality of positions along the rail to adjust the height of the D-loop and to adjust the pre-load in the system, respectively. A biasing member (e.g., a spring) can be positioned between the pre-loader and the D-loop assembly to resiliently urge the D-loop assembly toward the stop assembly. The biasing member can be compressible to allow some motion of the D-loop assembly toward the pre-loader in use, and the position of the pre-loader can be varied to adjust the compression of the biasing member. Allowing the D-loop assembly to move in response to tension loads in the shoulder belt web can reduce the forces experienced by the seatbelt wearer in use. In other embodiments, the devices, systems and associated methods described herein can have different configurations, components, and/or procedures. Still other embodiments may eliminate particular components and/or procedures. A person of ordinary skill in the relevant art, therefore, will understand that the present technology, which includes associated devices, systems, and procedures, may include other embodiments with additional elements or steps, and/or may include other embodiments without several of the features or steps shown and described below with reference to FIGS. 1-5B.

Certain details are set forth in the following description and FIGS. 1-5B to provide a thorough understanding of various embodiments of the disclosure. To avoid unnecessarily obscuring the description of the various embodiments of the disclosure, other details describing well-known structures and systems often associated with vehicle occupant restraint systems, seatbelt height adjusters, shock absorbers, and the components or devices associated with the manufacture of vehicle occupant restraint systems, seatbelt height adjusters, and shock absorbers are not set forth below. Moreover, many of the details and features shown in the Figures are merely illustrative of particular embodiments of the disclosure. Accordingly, other embodiments can have other details and features without departing from the spirit and scope of the present disclosure. In addition, the various elements and features illustrated in the Figures may not be drawn to scale. Furthermore, various embodiments of the disclosure can include structures other than those illustrated in the Figures and are expressly not limited to the structures shown in the Figures.

Figure 1:
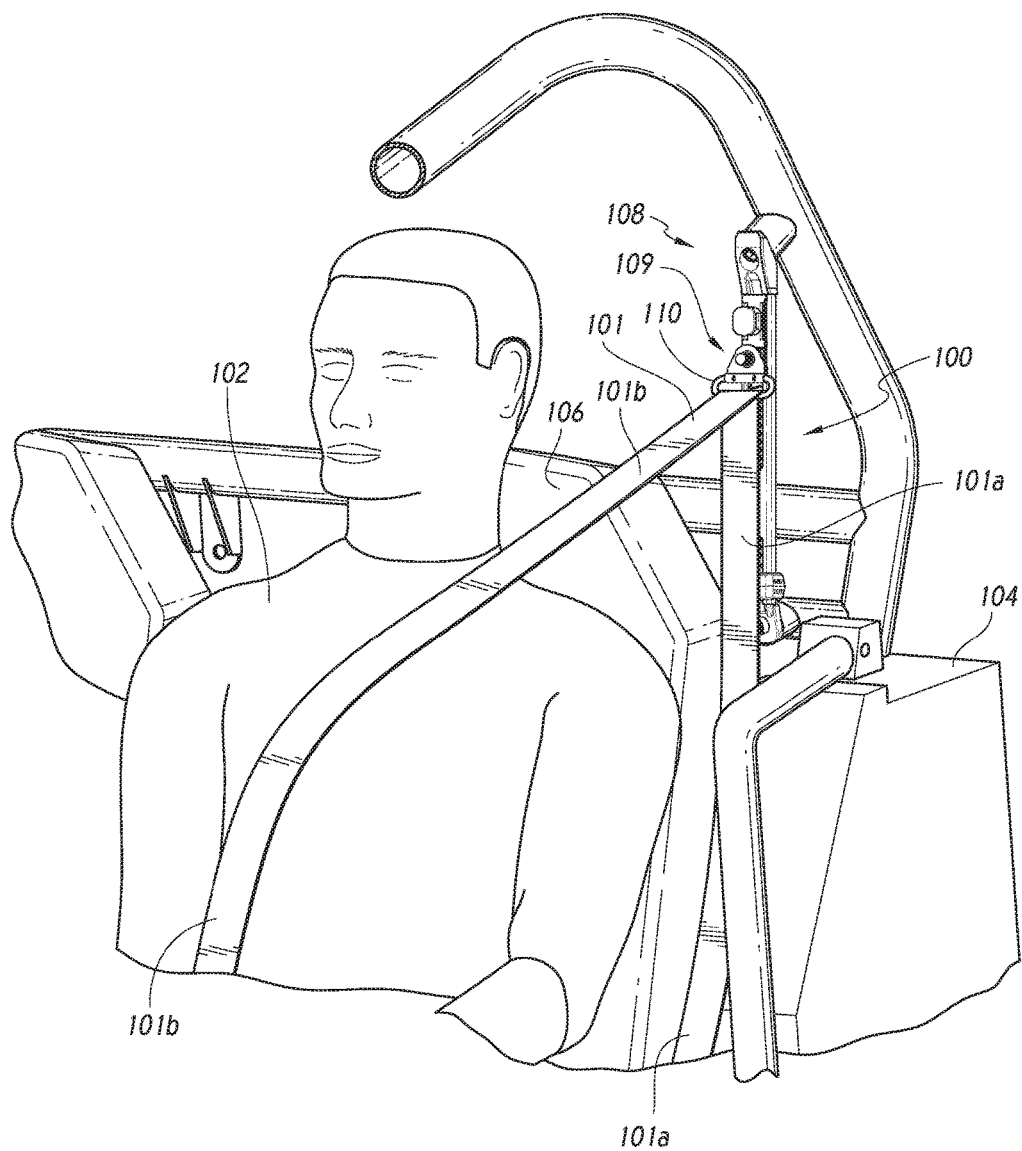
FIG. 1 is an isometric view of a restraint system configured in accordance with an embodiment of the present technology.

FIG. 1 is an isometric view of a vehicle occupant restraint system 100 configured in accordance with an embodiment of the present technology. In the illustrated embodiment, the restraint system 100 includes a seatbelt web 101 (i.e., a shoulder belt web) that secures an occupant 102 within a vehicle 104 (e.g., an RUV). More particularly, a first end portion 101a of the web 101 can be operably coupled to a retractor (not shown) that is fixed to the vehicle 104, and a second end portion 101b of the web 101b can include a connector (not shown) for releasably coupling the web 101 to a buckle (also not shown) mounted to the vehicle floor on an opposite side of a seat 106. The restraint system 100 includes a shock absorbing seatbelt height adjuster 108 that can be used to position a turning point of the web 101 at an appropriate position with respect to the occupant 102. More specifically, the height adjuster 108 includes an adjustable D-loop assembly 109 having a web receiver or D-Loop 110 through which the web 101 passes. The first portion 101a of the web 101 extends downwardly from the D-loop 110 to a web retractor (not shown), and the second portion 101b extends downwardly at an angle across the occupant 102 towards a buckle (not shown). As described in more detail below, the height of the D-loop 110 can be adjusted to position the turning point of the web 101 at a height that is comfortable for the occupant 102.

Figure 2:
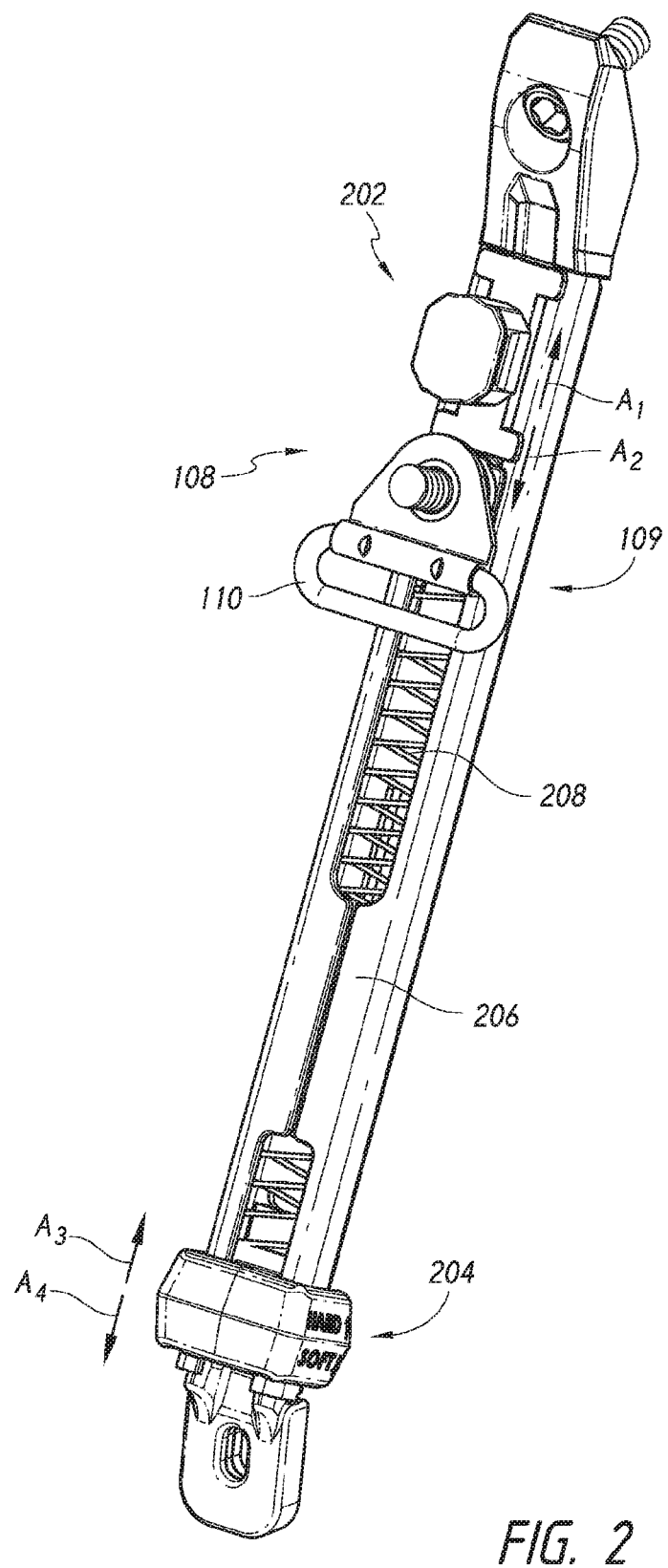
FIG. 2 is an enlarged isometric view of a shock absorbing height adjuster configured in accordance with an embodiment of the present technology.

FIG. 2 is an enlarged isometric view of the shock absorbing height adjuster 108 configured in accordance with an embodiment of the present technology. In the illustrated embodiment, the height adjuster 108 includes a height adjusting upper stop assembly 202 and an adjustable pre-loader 204. The stop assembly 202 and the pre-loader 204 are slidably coupled to a C-channel rail 206, and can be releasably lockable to the rail 206 at desired positions. As further described below, the stop assembly 202 is positionable as shown by arrows $A_1$ and $A_2$ to adjust the height of the D-loop assembly 109, and the pre-loader 204 is positionable as shown by arrows $A_3$ and $A_4$ to pre-compress a biasing member or spring 208 to set a desired amount of pre-load that biases the D-loop assembly 109 against the stop assembly 202.

Figure 3:
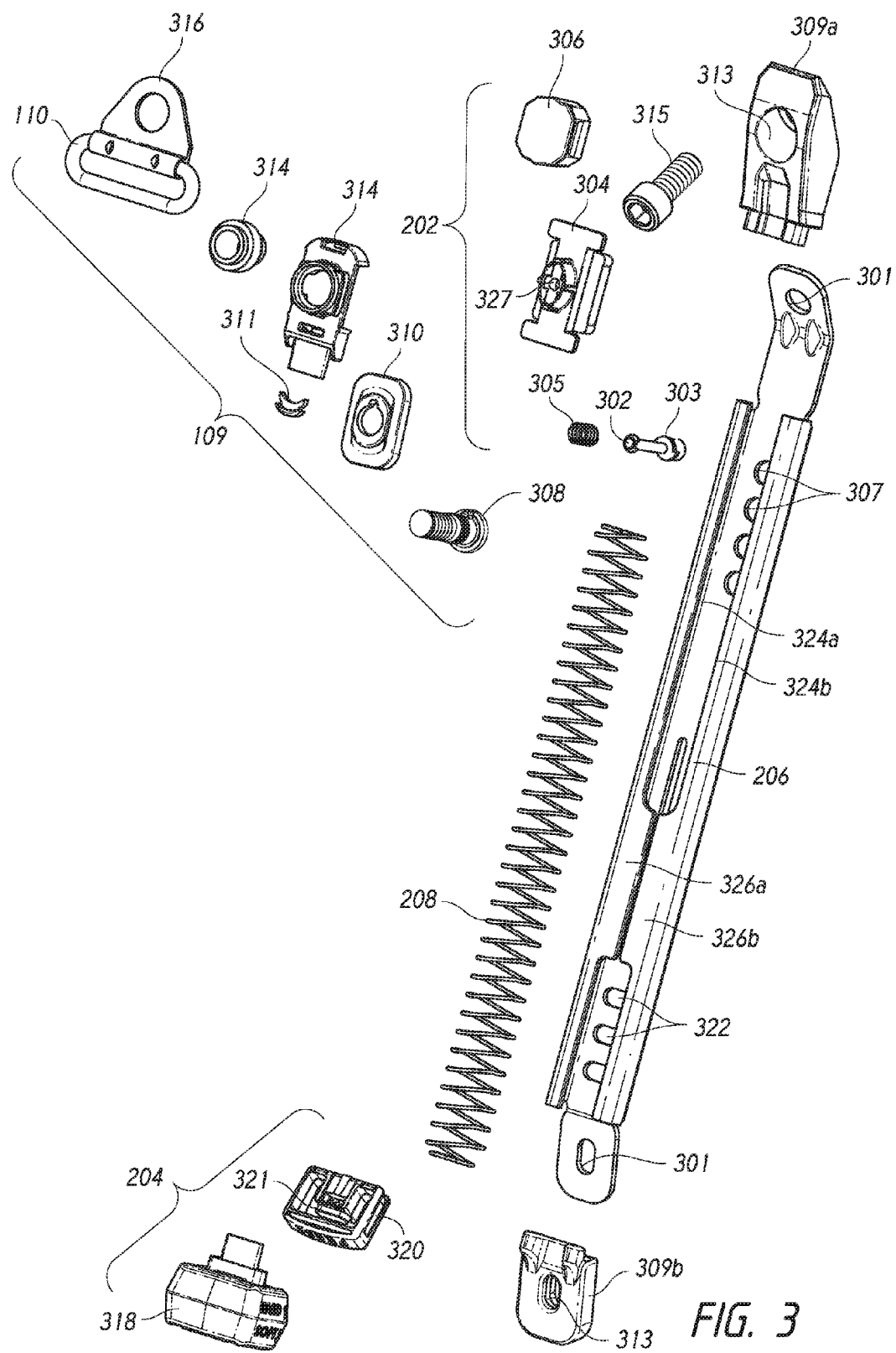
FIG. 3 is an exploded isometric view of the shock absorbing height adjuster of FIG. 2.

FIG. 3 is an exploded isometric view of the shock absorbing height adjuster 108 illustrating the various components in more detail. In the illustrated embodiment, the height adjuster 108 includes a pair of end caps 309 (identified individually as an upper end cap 309a and a lower end cap 309b) having openings 313. The bolts 315 (only one shown) can extend through the openings 309 and the mounting holes 301 to fixedly attach the height adjuster 108 to the vehicle 104. The rail 206 includes a plurality of mounting holes 301 on opposing ends thereof and, when assembled, the openings 313 of the end caps 309 align with the mounting holes 301 to receive one or more fasteners or bolts 315. The rail 206 has a C-shaped cross-section with a first flange 324a opposing a second flange 324b (collectively identified as the flanges 324). The flanges 324 include blocking portions 326 (identified individually as a first blocking portion 326a and a second blocking portion 326b).

The stop assembly 202 includes a spring-loaded release pin 302, a stop guide 304, and a release knob 306. The stop guide 304 can be slidably engaged with the flanges 324 of the rail 206, with the release pin 302 slidably extending through an aperture 327 in the stop guide 304 and engaging the release knob 306. The release pin 302 includes a head portion 303 configured to extend into any of a plurality of first openings 307 (e.g., circular apertures or holes) in the rail 206 to releasably lock the stop assembly 202 at a desired stop position along the rail 206. For example, the release pin 302 can be biased toward the openings 307 via a spring 305 that is compressed between the stop guide 304 and the head portion 303, and the release knob 306 can be pulled away from the rail 206 to move the release pin 302 out of an individual opening 307. The stop assembly 202 can then be moved on the rail 206 to another stop position and the release knob 306 released to engage the pin 302 with another opening 307. The openings 307 thereby constitute a plurality of stop positions, and moving the stop assembly 202 from one stop position to another (e.g., from one opening 307 to another opening 307) adjusts the upper position of the D-loop assembly 109, as further described below.

The D-loop assembly 109 includes a mounting bolt 308 that can extend through: a mounting plate 310, a D-loop guide 312, a mounting collar 314, and a D-loop bracket 316. The mounting plate 310 can be releasably engaged with the D-loop guide 312 via a locking tab 311. Together, the mounting plate 310 and the D-loop guide 312 can slidably engage the opposing flanges 324 of the rail 206. The D-loop bracket 316 pivotally carries the D-loop 110, and the mounting bolt 308 extends through apertures in the mounting plate 310, the D-loop guide 312, the mounting collar 314, and the D-loop bracket 316 to couple the D-loop bracket 316 to the rail 206. Accordingly, as described in more detail below, the D-loop guide 312 can slide along the rail 206 between the stop assembly 202 and the blocking portions 326.

Figure 4A:
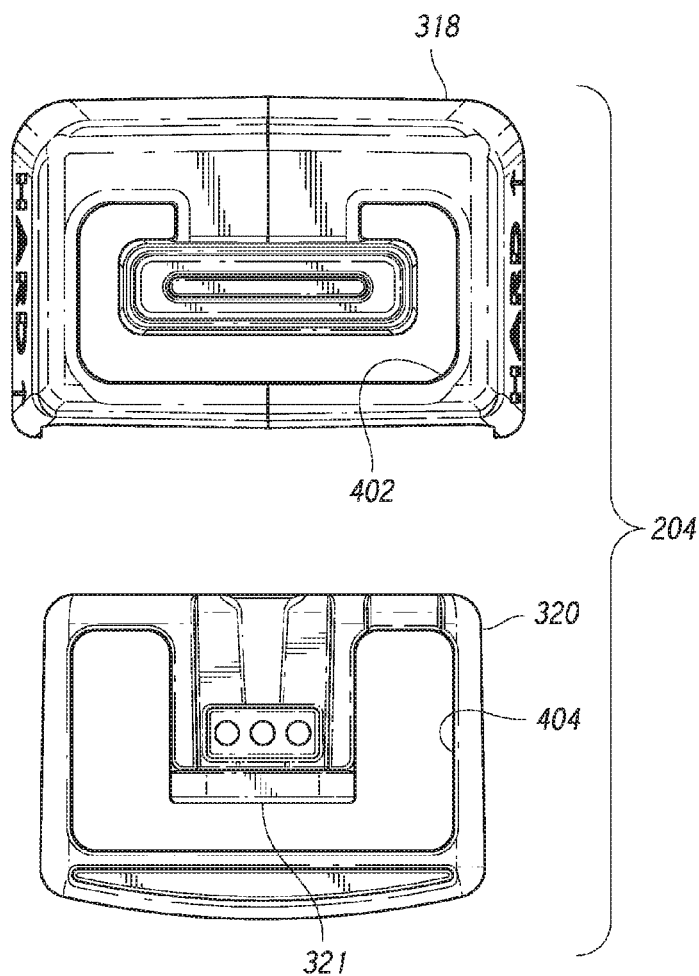
FIG. 4A is an exploded end view.
Figure 4B:
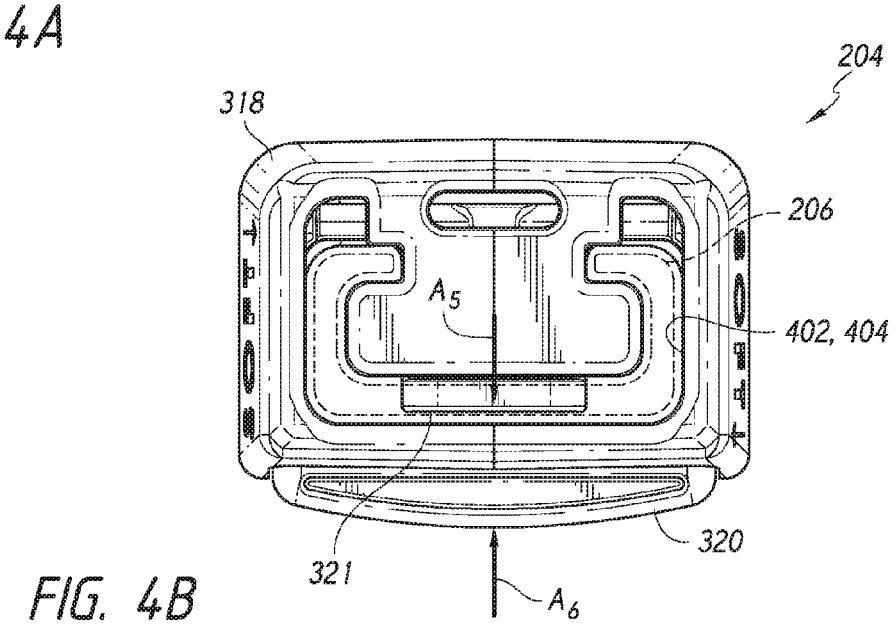
FIG. 4B is an assembled end view of a pre-loader configured in accordance with an embodiment of the present technology.

The adjustable pre-loader 204 includes a pre-loader guide 318 and a release button 320. FIGS. 4A and 4B are enlarged end views of the pre-loader 204 configured in accordance with an embodiment of the present technology. More particularly, FIG. 4A is an end view of the pre-loader 204 in an unassembled condition, and FIG. 4B is an end view of the pre-loader 204 in an assembled condition. Referring to FIGS. 3-4B, the release button 320 can be slidably positioned at least partially within the pre-loader guide 318 and, together, the release button 320 and the pre-loader guide 318 are slidable over the rail 206. In particular, the pre-loader guide 318 includes a first rail opening 402, and the release button 320 includes a second rail opening 404. The openings 402 and 404 are shaped to match the cross-section of the rail 206, and when assembled (as shown in FIG. 4B), the openings 402 and 404 align to slide over the rail 206 such that the pre-loader 204 encircles or encloses a section of the rail 206. The release button 320 includes an engagement feature 321 that can be releasably inserted into any of a plurality of second openings 322 in the rail 206 to lock the pre-loader 204 at a desired pre-load position along the rail 206. In one embodiment, a biasing member (not shown) urges the engagement feature 321 towards the second openings 322 in the direction of arrow $A_5$. The release button 320 can be depressed to move the engagement feature 321 in the direction of arrow $A_6$ and out of one of the second openings 322, and enable movement of the pre-loader 204 to another position where the release button 320 can be released to engage the engagement feature 321 with one of the second openings 322 at that location. The openings 322 thereby constitute a plurality of pre-load positions, and moving the pre-loader 204 from one pre-load position to another (e.g., from one opening 322 to another opening 322) adjusts a pre-load for the height adjuster 108, as further described below.

The spring 208 can be positioned within the C-shaped cross-section of the rail 206 and be operably compressed between the pre-loader 204 and the D-loop guide 312. Additionally, the spring 208 can be sized to be in a compressed state when the stop assembly 202 and the pre-loader 204 are engaged with one of the first openings 307 and one of the second openings 322, respectively. Movement of the pre-loader 204 towards the D-loop guide 312 increases the compression of the spring 208, and exerts additional force on the D-loop assembly 109 that biases the D-loop assembly 109 against the stop assembly 202, as described in more detail below. The blocking portions 326 of the flanges 324 limit movement of the pre-loader 204 in the direction of the D-loop assembly 109, and thereby limit the maximum pre-load of the spring 208.

In several embodiments, each of the components shown in FIG. 3 can be made from a metal or a metal alloy (e.g., steel) known in the art. For example, these components can be stamped, cut, rolled, formed, milled, or otherwise shaped from metal or alloy stock materials using one or more methods known in the art. In other embodiments, these and/or other components can be made from composite materials, plastics, and/or other materials. For example, in some embodiments the pre-loader 204, the D-loop guide 312, and the release knob 306 can be made from plastic.

Referring to FIGS. 1-4B together, in use, the occupant 102 can adjust the stop assembly 202 to comfortably position the web 101 relative to his or her shoulder. For example, the occupant 102 can pull the release knob 306 outwardly away from the rail 206 to withdraw the release pin 302 from the opening 307, and then slide the stop assembly 202 to a position on the rail 206 that accommodates the occupant's size. As shown in FIG. 1, for example, the stop assembly 202 is positioned such that the second web portion 101b extends comfortably across the occupant's clavicle. If the second web portion 101b is too low (e.g., extending across the occupant's shoulder and close to the occupant's arm), the occupant 102 can move the stop assembly 202 to a higher position on the rail 206. Alternatively, if the second web portion 101b is too high (e.g., close to the occupant's neck), the occupant can move the upper stop to a lower position on the rail 206. Regardless of the position of the stop assembly 202, the spring 208 biases the D-loop assembly 109 toward and against the stop assembly 202.

The occupant 102 can also adjust the compression of the spring 208 to set a desired pre-load that is suitable for the weight of the occupant 102 and/or the expected ride conditions. For example, for heavier riders and/or when a rough ride is expected, the occupant 102 can increase the pre-load by increasing the compression of the spring 208. Specifically, the occupant 102 can depress the release button 320 to move the engagement feature 321 out of the second opening 322 that it is currently positioned in, slide the pre-loader 204 toward the stop assembly 202 to further compress the spring 208, and then release the release button 320 in the adjacent second opening 322. For lighter occupants and/or when a smoother ride is expected, the occupant 102 can decrease the pre-load by moving the pre-loader 204 away from the stop assembly 202 and thereby reducing the compression in the spring 208.

In several embodiments, the pre-loader 204 and the stop assembly 202 can be easily adjusted by the occupant 102 while the occupant 102 is seated in the vehicle 104. For example, the occupant 102 can reach up and depress the release button 320 and/or pull the release knob 306 while seated in the vehicle. Additionally, the release button 320 and the release knob 306 can be sized and shaped so that they can be easily grasped and manipulated via a gloved hand.

In operation, the vehicle 104 can be subjected to deceleration events that cause the occupant 102 to accelerate forward from the seat 106. In such events, the web 101 is locked by a retractor on one end and by a fixed anchor on the other. As a result, the forward movement of the occupant 102 generates tension in the web 101 that acts on the D-loop assembly 109 via the D-loop 110. The force on the D-loop assembly 109 includes a downward component that pulls the D-loop assembly 109 downwardly away from the stop assembly 202 and toward the blocking portions 326, thereby compressing the spring 208. The spring 208 resists this movement, and progressively increases the resistance as the D-loop assembly 109 moves closer to the blocking portions 326. The progressive resistance provided by the spring 208 can reduce the maximum force that would otherwise be applied to the occupant 102 by the web 101 during a deceleration event. Specifically, in vehicles that have a fixed turning point for the shoulder belt web, the web provides very little, if any "give," and the occupant is effectively immediately subjected to the entire restraint force applied by the web. With the shock absorbing height adjuster 108, the force applied to the occupant 102 via the web 101 is applied over a longer period of time as the spring 208 is compressed, thereby reducing the maximum force applied to the occupant 102. Accordingly, the shock absorbing height adjuster 108 can help to reduce occupant discomfort and fatigue, and provide a more enjoyable vehicle operating experience.

At the end of a deceleration event, when the occupant 102 stops moving forward relative to the seat 106, the spring 208 urges the D-loop assembly 109 back toward the stop assembly 202. In many low deceleration events, the forces applied via the web 101 compress the spring 208 by small amounts that involve relatively little motion of the D-loop assembly 109. In significant deceleration events, however, the D-loop assembly 109 can compress the spring 208 to a point at which the D-loop assembly 109 impacts the blocking portions 326 of the flanges 324. In such events, the blocking portions 326 provide a "hard stop" that prevents additional movement of the D-loop assembly 109 and associated forward movement of the occupant 102. In several embodiments, the rail 206 can be constructed to position the blocking portions 326 to provide a predetermined amount of forward movement of the occupant 102 before reaching the hard stop. The amount of forward movement can be determined based on features of a particular vehicle that uses the height adjuster 108. For example, features such as the mounting position of the height adjuster 108, the distance between a seat and other components of a vehicle (e.g., a steering wheel), and/or other factors.

In several embodiments, the spring 208 can be selected to provide desired compression characteristics. For example, the spring 208 can be selected based at least partially on a spring constant that provides an appropriate amount of resistance for an occupant 102 having an average weight. In several embodiments, a plurality of springs 208 having different spring constants can be available for use in the height adjuster 108. In such embodiments, the springs 208 can be selected based on, e.g., a spring constant that matches a weight and/or an expected ride quality. The availability of a variety of springs 208 can allow an owner of the vehicle 104 to tailor the operation of the height adjuster 108 to a variety of different occupant weights and/or a variety of driving characteristics. Additionally, in several embodiments, the height adjuster 108 can include more than one spring 208 (e.g., two springs 208) that together provide a desired spring constant and/or other operational characteristics. In some embodiments, the spring 208 can have a spring constant and a shape that is similar to or identical to that of a spring used in a magazine or clip for a firearm.

Figure 5A:
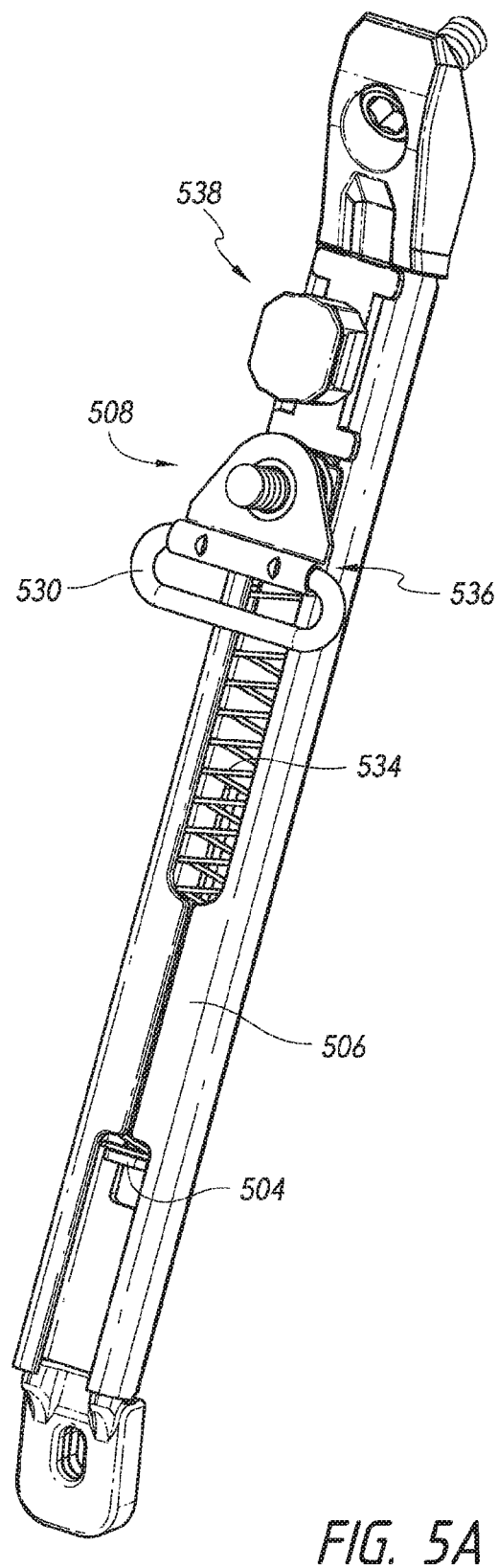
FIGS. 5A and 5B are isometric and exploded isometric views, respectively, of a shock absorbing height adjuster configured in accordance with another embodiment of the present technology.
Figure 5B:
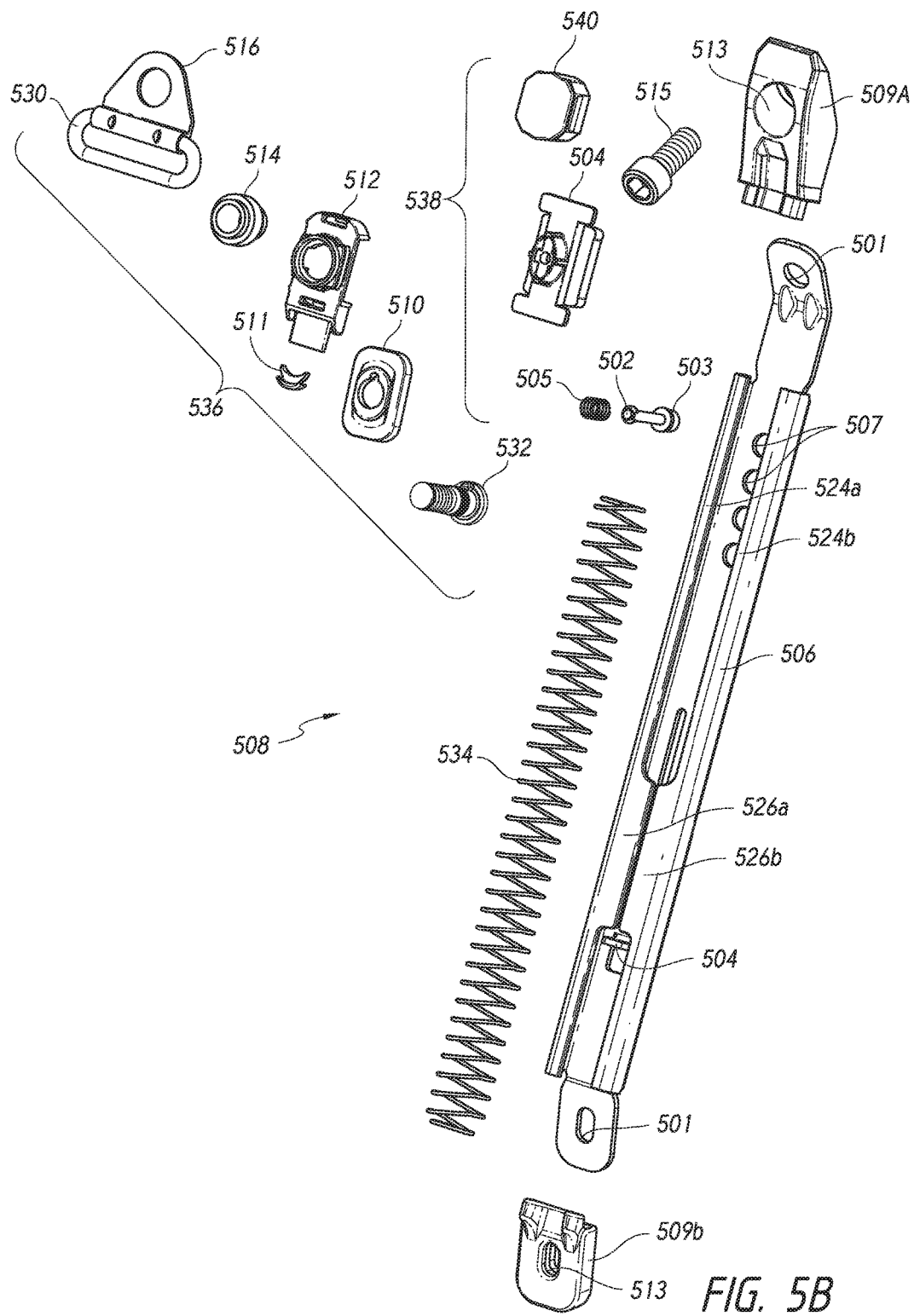

FIGS. 5A and 5B are isometric and exploded isometric views, respectively, of a shock absorbing height adjuster 508 configured in accordance with another embodiment of the present technology. In the illustrated embodiment of FIGS. 5A and 5B, the shock absorbing height adjuster 508 includes several features that are at least generally similar to features of the shock absorbing height adjuster 108 discussed above with reference to FIGS. 1-4B. For example, referring to FIGS. 5A and 5B together, the shock absorbing height adjuster 508 includes a rail having mounting holes 501 on opposing ends thereof. When assembled, openings 513 on end caps 509 align with the mounting holes 501 to receive one or more fasteners or bolts 515 for fixedly attaching the height adjuster 508 to the vehicle 104 (FIG. 1). The rail 506 also includes a C-shaped cross-section with a first flange 524a opposing a second flange 524b (collectively identified as the flanges 524). The flanges 524 include blocking portions 526 (identified individually as a first blocking portion 526a and a second blocking portion 526b).

The height adjuster 508 can also include a D-loop assembly 536 and a height adjusting upper stop assembly 538. The stop assembly 538 includes a spring-loaded release pin 502, a stop guide 504, and a release knob 540. The release pin 502 can include a head portion 503 configured to extend into any of a plurality of openings 507 in the rail 506 to releasably lock the stop assembly 538 at a desired stop position along the rail 506. The release pin 502 can slidably extend through an aperture in the stop guide 504 and engage the release knob 540. The stop guide 504 can be slidably engaged with flanges 524, and the release pin 502 can be biased toward the openings 507 via a spring 505.

The D-loop assembly 536 includes a mounting bolt 532 that can extend through: a mounting plate 510, a D-loop guide 512, a mounting collar 514, and a D-loop bracket 516. The mounting plate 510 can be releasably engaged with the D-loop guide 512 via a locking tab 511. Together, the mounting plate 510 and the D-loop guide 512 can slidably engage the opposing flanges 524 of the rail 506. The D-loop bracket 516 pivotally carries a D-loop 530, and the mounting bolt 532 extends through apertures in the mounting plate 510, the D-loop guide 512, the mounting collar 514, and the D-loop bracket 516 to couple the D-loop bracket 516 to the rail 506. Similar to the discussion above with respect to the height adjuster 108, the D-loop guide 512 can slide along the rail 506 between the stop assembly 538 and the blocking portions 526.

The rail 506 also includes a tang 504 that is positioned to engage a biasing member or spring 534. Similar to the spring 208, the spring 534 biases the D-loop assembly 536 toward the stop assembly 538. The amount of biasing or pre-load provided by the spring 534 can be adjusted by replacing one spring 534 by another spring 534 having a different spring constant.

In operation, the height adjuster 508 can function in a manner that is at least generally similar to the height adjuster 108. For example, the occupant 102 (FIG. 1) can adjust the stop assembly 538 to comfortably position the web 101 relative to his or her shoulder. E.g., the occupant 102 can pull the release knob 540 outwardly away from the rail 506 to withdraw the release pin 502 from the opening 507, and then slide the stop assembly 538 to a position on the rail 506 that accommodates the occupant's size. Regardless of the position of the stop assembly 538, the spring 534 biases the D-loop assembly 536 toward and against the stop assembly 538. If the vehicle 104 is subjected to a deceleration event, forward movement of the occupant 102 can generate tension in the web 101 that pulls the D-loop assembly 536 downward and compresses the spring 534. The spring 534 resists this movement, and progressively increases the resistance as the D-loop assembly 536 moves closer to the blocking portions 526. The progressive resistance provided by the spring 534 can reduce the maximum force that would otherwise be applied to the occupant 102 by the web 101 during a deceleration event.

Although the height adjuster 508 includes the tang 504, other embodiments can include other components that can engage the spring 534. For example, clamps, bolts, or other components can be positioned to engage and compress the spring 534 to provide pre-load.

Various embodiments of the shock absorbing height adjusters 108 and 508 can include several advantageous features. For example, in several embodiments, the biasing members 208 and 534 can be metal coil springs. In such embodiments, the springs 208 and 534 can provide consistent performance over a wide range of temperatures. Moreover, in several embodiments, the springs 208 and 534 can provide consistent performance over an extended operational lifetime. For example, when constructed of a metal or metal alloy, the springs 208 and 534 can maintain consistent operation over a greater operational lifetime than that provided by other biasing members that may degrade from dry rot or ultraviolet light exposure (e.g., particular polymers or other particular elastomers). In another example of the advantages provided by the embodiments disclosed herein, the rails 206 and 506 (and/or other components) can be constructed of steel or other metal alloys that provide significant strength advantages over similar restraint system components constructed of elastomers or polymers Additionally, the components shown in FIGS. 1-5B can provide for dependable operation in harsh environments that are often encountered by RUVs. For example, the relatively open shape of the C-channel rails 206 and 506 can allow water, mud or other debris to pass through and fall out the bottom of the height adjusters 108 and 508, rather than collect in the height adjusters 108 and 508 and potentially hinder operations. Yet another advantage of the embodiments disclosed herein is provided by the bolt-on design that allows for the integration of the shock absorbing height adjuster into existing restraint systems during vehicle assembly or as an aftermarket addition. A further advantage can be provided by the direct webbing path through the D-loops 110 and 530, which can provide reduced friction and a more direct loading path than that provided by alternative restraint system components.

In some embodiments, the height adjusters 108 and 508 (and/or other components of the restraint system 100) can include one or more load indicators that can provide an indication to the occupant 102 that the function and performance of the restraint system 100 may be compromised. For example, the application of a design-level load to the height adjuster 108 or 508 can provide an indication via relative motion of components of the height adjuster 108 or 508. In one example, movement of the D-loops 110 of 530 (or the D-loop assemblies 109 or 536) during a design-level load can expose a flag or release a pop-up indicator. In several embodiments, such load indicating features can be at least generally similar to those described in U.S. Patent Application No. 62/236,792, filed Oct. 2, 2015, and entitled Load Indicators for Personal Restraint Systems and Associated Systems and Methods, which is incorporated by reference herein in its entirety.

In addition to providing an indication of a design-level load, in at least some embodiments, the load indicating features can also absorb some of the forces that act on the restraint system 100, and thereby lower the forces experienced by the occupant 102. In several embodiments, such load absorbing features can be at least generally similar to those described in the patent application incorporated by reference above, and/or in U.S. patent application Ser. No. 13/441,689, filed Apr. 6, 2012, and U.S. Patent Application No. 61/473,070, filed Apr. 7, 2011, each of which is incorporated by reference herein in its entirety. For example, components of the height adjusters 108 and 508 or components of the restraint system 100 can include features that can be constructed to be deformed or crushed at a particular load value or design-level load to dissipate energy. In several embodiments, the deformation or crushing of the features that results from the application of a design-level load can provide for relative motion between components of the restraint system, and provide an associated indication that the system has sustained a design-level load during, for example, an accident or other vehicle impact. For example, in several embodiments, the rails 206 and 506 can include a deformable feature (e.g., one or more deformable protrusions) at the blocking portions 326 and 526. Under a design level load, the deformable feature can provide for additional movement of the D-loop assemblies 109 and 536, into the blocking portions 326 and 526. In another embodiment, the D-loop brackets 316 and 516 can include a deformable portion that, under a design-level load, provides for movement of the mounting bolts 308 and 532 with respect to the D-loop brackets 316 and 516, respectively.

Although the vehicle 104 in FIG. 1 is a recreational utility vehicle (RUV), the restraint system 100 and/or the shock absorbing height adjusters 108 and 508 can be can installed in a variety of other vehicles (e.g., buses, tractor trailers, passenger automobiles, and/or any other vehicle having restraint systems for vehicle occupants). In vehicles having suspension seats (e.g., class 8 vehicles), additional tension is often applied to a seatbelt web when the seat moves relative to the associated vehicle. The shock absorbing height adjusters 108 and 508 can provide significant relief from unnecessary discomfort caused by the movement of these suspension seats.

Additionally, although the shock absorbing height adjusters 108 and 508 are described above as providing a turning point for a web 101 near an occupant's shoulder, in other embodiments, the shock absorbing height adjusters 108 and 508 can provide similar functionality for other portions of a restraint system. For example, in some embodiments, the shock absorbing height adjusters 108 and 508 can be used as an anchor point for a buckle assembly that connects to the web 101 on one side of the seat 106 near the occupant's waist. In such embodiments, the shock absorbing height adjusters can enable movement of the buckle assembly relative to the vehicle, and provide for a decrease in the maximum forces applied to an occupant via the associated restraint system.

From the foregoing, it will be appreciated that specific embodiments have been described herein for purposes of illustration, but that various modifications may be made without deviating from the spirit and scope of the present technology. Those skilled in the art will recognize that numerous modifications or alterations can be made to the components or systems disclosed herein. Moreover, certain aspects of the present technology described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the present technology. Accordingly, the inventions are not limited except as by the appended claims.

We claim:

1. A shock absorbing seatbelt adjuster, comprising:
a rail;
a seatbelt web receiver slidably engaged with the rail;
a stop engaged with the rail to a first side of the web receiver, wherein the stop is lockable at a plurality of stop positions along the rail;
a pre-loader engaged with the rail to a second side of the web receiver, opposite to the first side, wherein the pre-loader is lockable at a plurality of pre-load positions along the rail; and
a biasing member extending between the web receiver and the pre-loader, wherein the biasing member biases the web receiver toward the stop, and wherein the web receiver is slidable along the rail away from the stop in response to a force applied to the web receiver.

2. The shock absorbing seatbelt adjuster of claim 1 wherein the biasing member is a spring, and wherein movement of the pre-loader from a first pre-load position to a second pre-load position along the rail varies compression of the spring.

3. The shock absorbing seatbelt adjuster of claim 1 wherein movement of the stop from a first stop position to a second stop position varies a position of a web turning point defined by the web receiver.

4. The shock absorbing seatbelt adjuster of claim 1 wherein the rail includes a blocking portion positioned to limit movement of the web receiver away from the stop.

5. The shock absorbing seatbelt adjuster of claim 1 wherein the pre-loader includes an aperture, and wherein the rail extends through the aperture.

6. The shock absorbing seatbelt adjuster of claim 1 wherein the rail includes a plurality of openings, wherein individual openings correspond to individual stop positions, and wherein the stop includes a pin receivable in the individual openings to lock the stop at the associated stop position.

7. The shock absorbing seatbelt adjuster of claim 1 wherein the biasing member is a spring, wherein a first pre-load position corresponds to a first amount of compression of the spring, and wherein a second pre-load position corresponds to a second amount of compression of the spring, different than the first.

8. The shock absorbing seatbelt adjuster of claim 1 wherein the rail has a C-shaped cross-section and a plurality of openings, wherein individual openings correspond to individual pre-load positions, and wherein the pre-loader includes:
a pre-loader guide having a first rail opening shaped to enclose a section of the rail; and
a release button having a second rail opening shaped to enclose the section of the rail, wherein the release button is operable to disengage the pre-loader from individual openings to adjust an amount of pre-load.

9. A shock absorbing seatbelt height adjuster for a vehicle occupant restraint system, the shock absorbing seatbelt height adjuster comprising:
a rail;
a D-loop slidably coupled to the rail;
an adjustable stop slidably coupled to the rail and lockable at a plurality of positions along the rail; and
a biasing member positioned to urge the D-loop against the stop, wherein the biasing member is compressible to allow the D-loop to move away from the stop in response to tension in a seatbelt extending through the D-loop.

10. The shock absorbing seatbelt height adjuster of claim 9 wherein the plurality of positions comprise a first plurality of positions, the shock absorbing height adjuster further comprising a pre-loader slidably coupled to the rail and lockable at a second plurality of positions along the rail, wherein the pre-loader is releasably lockable at the second plurality of positions along the rail to vary a compression in the biasing member.

11. The shock absorbing seatbelt height adjuster of claim 10 wherein the pre-loader is shaped to enclose a section of the rail.

12. The shock absorbing seatbelt height adjuster of claim 9 wherein the stop is lockable at the plurality of positions to adjust a position of the D-loop.

13. The shock absorbing seatbelt height adjuster of claim 9 wherein the rail includes a tang positioned to engage the biasing member, and wherein the biasing member is compressed when the D-loop is positioned adjacent the stop.

14. The shock absorbing seatbelt height adjuster of claim 9 wherein the rail includes a C-shaped cross-section, and wherein the biasing member is positioned within the C-shaped cross-section.

15. The shock absorbing seatbelt height adjuster of claim 9 wherein the rail includes a means for limiting motion of the D-loop.

16. The shock absorbing seatbelt height adjuster of claim 15 wherein the means comprises a flange having a blocking portion.

17. A method for providing a seatbelt with shock absorption capabilities, the method comprising:
   slidably coupling a web receiver to a rail;
   operably coupling the seatbelt to the web receiver;
   slidably coupling a stop to the rail to one side of the web receiver, wherein the stop is lockable at a plurality of stop positions along the rail;
   slidably coupling a pre-loader to the rail to another side of the web receiver, opposite the one side, wherein the pre-loader is lockable at a plurality of pre-load positions along the rail; and
   resiliently biasing the web receiver against the stop.

18. The method of claim 17 wherein biasing the web receiver includes positioning a spring between the stop and the pre-loader, and wherein the spring is compressible to provide the shock absorption capabilities via movement of the web receiver toward the pre-loader to compress the spring.

19. The method of claim 18 wherein slidably coupling the web receiver to the rail includes slidably coupling the web receiver to the rail between a blocking portion of the rail and the plurality of stop positions, and wherein the web receiver is slidable to compress the spring and engage the blocking portion.

20. The method of claim 17 wherein slidably coupling the pre-loader to the rail includes sliding the pre-loader over the rail such that the pre-loader encloses a section of the rail.

* * * * *